(12) United States Patent
Thomas et al.

(10) Patent No.: US 6,672,628 B2
(45) Date of Patent: Jan. 6, 2004

(54) QUICK CONNECT HOSE COUPLING

(75) Inventors: Kurt Thomas, Indianapolis, IN (US); Daniel Zendzian, Carmel, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 10/079,030

(22) Filed: Feb. 20, 2002

(65) Prior Publication Data

US 2003/0155765 A1 Aug. 21, 2003

(51) Int. Cl.[7] .............................................. F16L 37/088
(52) U.S. Cl. .................... 285/320; 285/308; 285/311; 285/373; 285/148.27
(58) Field of Search ................ 285/320, 308, 285/373, 311, 148.27

(56) References Cited

U.S. PATENT DOCUMENTS

| | | | |
|---|---|---|---|
| 3,432,188 A | * | 3/1969 | Turner ........................ 285/197 |
| 3,456,965 A | | 7/1969 | Gajewski et al. |
| 3,776,579 A | | 12/1973 | Gale |
| 3,791,679 A | * | 2/1974 | Glover ........................ 285/155 |
| 4,332,404 A | * | 6/1982 | Huffman ..................... 285/223 |
| 4,358,140 A | | 11/1982 | Jonsson |
| 4,573,715 A | | 3/1986 | Armbruster |
| 4,615,543 A | | 10/1986 | Cannon |
| 4,722,555 A | | 2/1988 | Soultatis |
| 4,741,559 A | * | 5/1988 | Berghman ................... 285/45 |
| 4,821,818 A | | 4/1989 | Mefferd |
| 5,074,600 A | | 12/1991 | Weinhold |
| RE33,946 E | | 6/1992 | Corzine |
| 5,238,221 A | | 8/1993 | Schwaderer et al. |
| 5,266,740 A | | 11/1993 | Hsu |
| 5,269,572 A | | 12/1993 | Mefferd |
| 5,330,235 A | | 7/1994 | Wagner et al. |
| 5,415,825 A | * | 5/1995 | Sellers ........................ 264/262 |
| 5,437,483 A | | 8/1995 | Umezawa |
| 5,480,193 A | | 1/1996 | Echols et al. |
| D371,431 S | | 7/1996 | Streit |
| 5,620,210 A | | 4/1997 | Eyster et al. |
| 5,653,475 A | | 8/1997 | Scheyhing et al. |
| 5,738,384 A | | 4/1998 | Boehme |
| 6,065,779 A | | 5/2000 | Moner et al. |
| 6,102,448 A | | 8/2000 | Fixemer et al. |
| 6,106,025 A | | 8/2000 | Kang |
| 6,106,028 A | | 8/2000 | Godeau et al. |

FOREIGN PATENT DOCUMENTS

| | | | |
|---|---|---|---|
| DE | 2102198 | * | 7/1972 |
| EP | 0 392 908 A1 | | 10/1990 |
| JP | 1-299391 | | 12/1989 |

* cited by examiner

*Primary Examiner*—Lynne H. Browne
*Assistant Examiner*—Giovanna M Collins
(74) *Attorney, Agent, or Firm*—Kwadjo Adusei-Poku; Lloyd D. Doigan

(57) ABSTRACT

A hose and quick connect coupling assembly comprising a receiving hose, an insertion hose, a pair of quick connect coupling halves each coupling half being identical to the other, and a securing clasp. The securing clasp releasably secures the coupling halves around the receiving hose, thereby forming a releasable coupling as the insertion hose in inserted into the receiving hose. The insertion hose may be removed by depressing the coupling halves together, causing the top portions thereof to pivot away from the insertion hose. The securing clasp may also be removed from the hose coupling, thereby removing the coupling halves from the receiving hose.

10 Claims, 5 Drawing Sheets

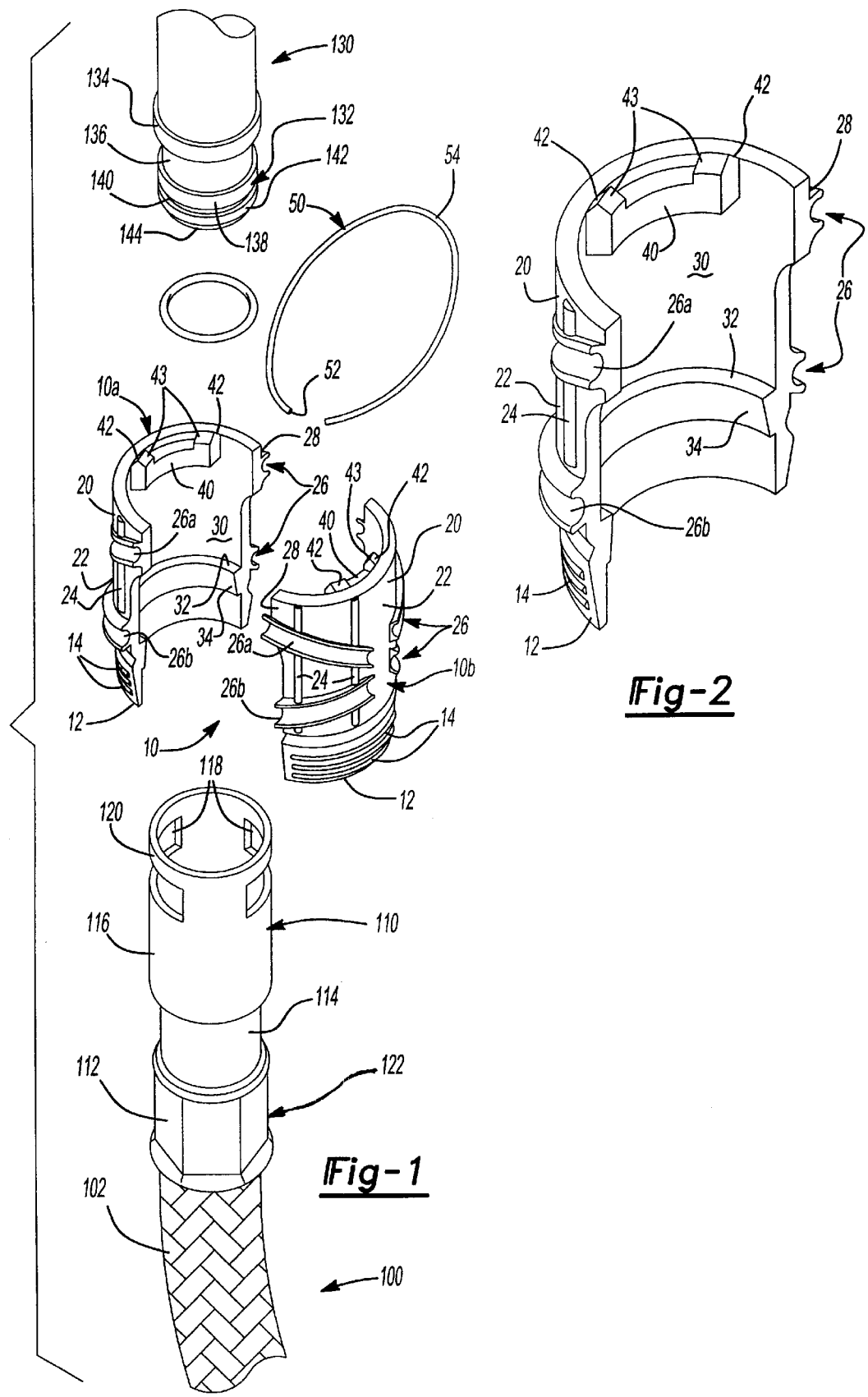

QUICK CONNECT HOSE COUPLING

FIELD OF THE INVENTION

The present invention relates to a quick connect coupling for securing together two generally cylindrical articles such as hoses.

BACKGROUND OF THE INVENTION

Connecting two conduits, such as water pipes or lines, together, especially in a restricted space such as under a sink, is a rather awkward and involved process. It normally requires a clamp or swivel nut, which must be tightened by the installer. This involves the installer getting under the sink, using both hands, and utilizing tools such as a screwdriver or wrench. It would be very advantageous if two conduits, such as water hoses, could be connected rather easily and without the use of tools.

The present invention provides a quick connect coupling that eliminates the need for threaded fittings when connecting, for example, a faucet valve or spout to a flexible hose.

SUMMARY OF THE INVENTION

The present invention provides a quick connect coupling for connecting two conduits such as water pipes. The quick connect coupling comprises a two coupling halves secured together by an elliptical clasp. The two halves are positioned about a first fluid conduit, a receiving conduit, the receiving conduit being fitted with a hose adapter. The two coupling halves are secured to the receiving conduit via the elliptical clasp. The second fluid conduit has an insertion nipple, either fitted to or manufactured as part of the insertion end of the second fluid conduit. As the second fluid conduit is attached to the receiving conduit, the quick connect coupling snaps into grooves on the insertion adapter, thus securing the two conduits together. The two quick connect coupling halves may be separated to remove the second fluid conduit from the receiving conduit.

BRIEF DESCRIPTION OF THE DRAWINGS

FIG. 1 is an exploded perspective view of the quick connect coupling of the present invention positioned along a receiving conduit, and showing a securing clasp and the insertion conduit;

FIG. 2 is a perspective view of one of the quick connect coupling halves;

DESCRIPTION OF THE PREFERRED EMBODIMENT

FIG. 1 illustrates the preferred embodiment of the quick connect coupling of the instant invention, comprising two separate coupling halves 10, and a securing clasp 50. The quick connect coupling serves to connect two fluid conduits by simply inserting a first conduit into a receiving conduit. This "snap" connection proscribes the use of a threaded or other cumbersome connection, particularly when the connection must be made in an inconvenient location like, for example, under a sink.

Figure 4:
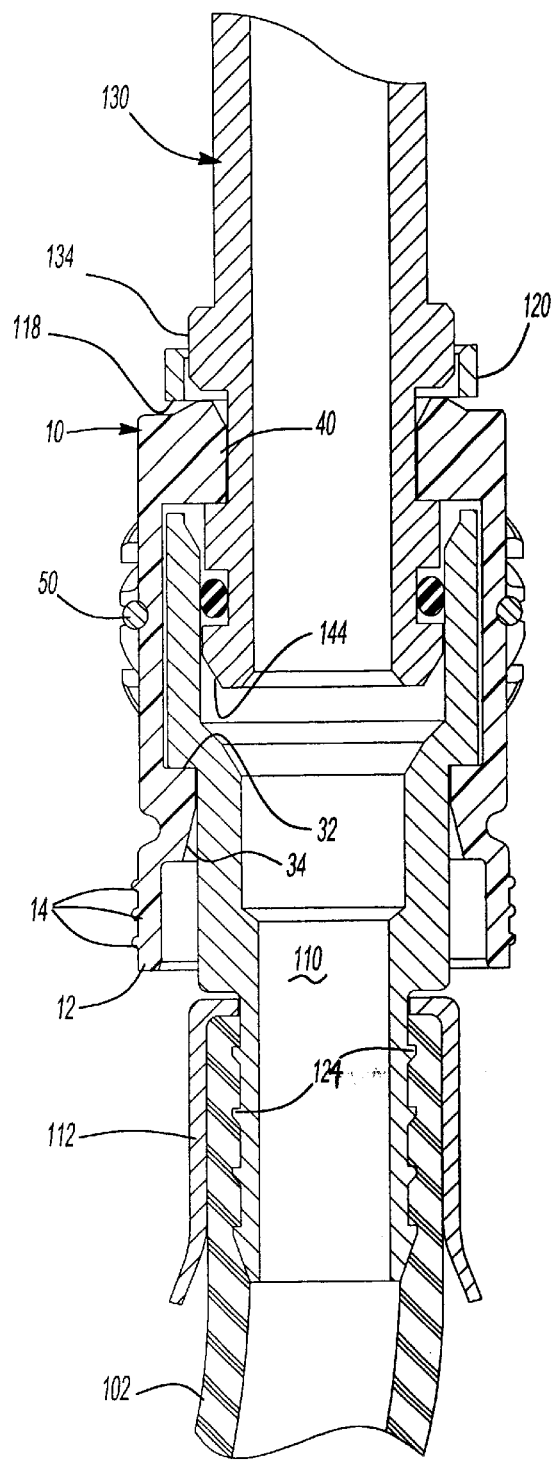
FIG. 4 is a cross sectional view taken along lines 4—4 in FIG. 3.

Also illustrated in FIG. 1 are the fluid conduits to be connected As shown, a first fluid conduit, a receiving conduit 100, is fitted with an adapter 110 at its distal end. The adapter 110 may either be an integral part of the conduit, in cases where the receiving conduit 100 is a copper, brass or other metal tube. However, where the receiving conduit 100 is a flexible hose 102 of a non-metal material, then the adapter 110 is secured onto the end of the hose 102. The adapter 110 may be secured by numerous methods like, for example, clamping the adapter to the hose 102, as shown in FIG. 1, or by threading the adapter onto the hose 102. It is even possible to modify the proximal end 122 of adapter 110 into a series of barbs 124 for insertion into the hose 102 resulting in an interference fit between the hose 102 and the adapter 110. This modification to the adapter 110 is illustrated in FIG. 4.

Referring once again to FIG. 1, the adapter 110 comprises a clamp section 112, a waist section 114, and a top section 116. The waist section 114 has a smaller diameter than the top section 116 and the clamp section 112. Two opposing openings or slots 118 are machined into the top section 116 of the adapter 110, leaving an annular rim 120 as the distal most portion of the adapter 110. In this preferred embodiment the adapter 110 is machined from brass.

The second fluid conduit, an insertion conduit 130, is also fitted with an insertion nipple 132 at its distal end, which, as is the case in this preferred embodiment, may be part of the insertion conduit 130 itself. However, where the insertion conduit is a flexible hose made from a non-metallic material, this insertion nipple 132 would be attached in some suitable manner to the insertion end of the insertion conduit 130. The insertion nipple 132 comprises an annular stop 134, a locking groove 136, a step 138, an o-ring groove 140, and an insertion end portion 142 that has an inwardly tapered tip section 144. As shown in FIG. 1, the annular stop 134, the step 138, and the insertion end portion 142 are of larger diameter than the surrounding conduit, locking groove 136 and o-ring groove 140, respectively. As with the adapter 110, the insertion nipple 132 is preferably machined from brass or other suitable metal. However, it is foreseeable that both the adapter 110 and the insertion nipple 132 are made from an elastomeric or hard plastic material.

As shown in FIGS. 1 and 2, the quick connect coupling comprises two coupling halves 10 and an elliptical securing clasp 50. The coupling half 10 is preferably molded as an integral piece from a resilient material such as a high strength plastic, for example, a glass filled polypropylene, or other like material may be used. The coupling half 10 comprises a bottom grip section 12 and a body section 20. Circumferential ridges 14 that provide a gripping surface for an operator characterize the grip section 12. The body section 20 comprises an outer surface 22 and a top rim region 28. Running axially along the outer surface 22 of the body section 20 are a plurality of longitudinal ribs 24. Over the longitudinal ribs 24, and running in an "X" or "crisscross" fashion are a pair of tracks 26. The first set of tracks 26a run in a diagonal fashion from a first upper corner to the opposite bottom corner of the body section 20. The second set of tracks 26b run counter to the first set of tracks 26a, from a first lower corner to the opposite top corner of body section 20.

Running circumferentially along the inner surface 30 of the coupling half 10, roughly at the intersection between the body section 20 and the gripping section 12, is an inner ledge 32. The bottom portion 34 of the inner ledge 32 is angled backwards towards the inner surface 30. Also along the inner surface 30, towards the top rim region 28, is a locking tab 40. The locking tab 40 protrudes away from the inner surface 30. The locking tab 40 comprises an angled roof section 42 having an inside slope 43 and outside slope 44.

The elliptical securing clasp 50 is preferably manufactured from a stainless steel wire or other resilient spring material. As shown, the securing clasp 50 is elliptical in shape and is open at what is referred to herein as the apex 52. Opposite the apex 52 is the base 54 of the clasp, which, in operation, serves as a hinge point between the two coupling halves 10.

Figure 3:
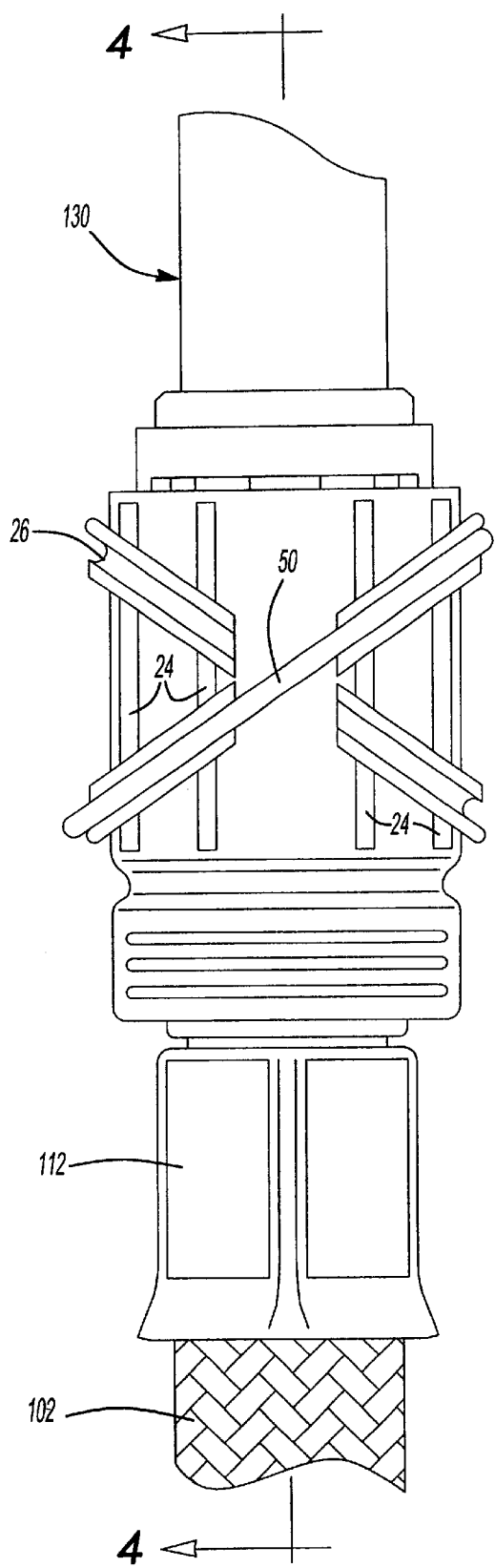
FIG. 3 is a front elevational view of the quick connect coupling connecting the receiving conduit to the insertion conduit.

FIGS. 3 and 4, illustrate the quick connect coupling halves 10 assembled onto the receiving conduit 100. As shown, the adapter 110 is securely attached to the hose 102. Next, both coupling halves 10a, 10b are placed opposing each other about the adapter 110 such that the locking tab 40 rests within the slots 118. The axial distance between the locking tab 40 and the inner ledge 32 is such that when the locking tab 40 is inserted within the slot 118, the inner ledge 32 rests against the waist section 114 of adapter 110.

Next, the securing clasp 50 is positioned within one of the opposing sets of tracks 26a or 26b, in the first coupling half 10a, and within the other set of tracks in the second coupling half 10b, as best shown in FIG. 3. As only one set of tracks 26 are used at any time, it is possible to construct the coupling halves 10a, 10b with only one set of tracks 26. However, by constructing both sets of tracks 26 on each coupling half 10a, 10b, the coupling halves 10 remain entirely interchangeable. The longitudinal ribs 24 are not essential to the construction and operation of the coupling halves 10. However, the longitudinal ribs 24, when present assist with the positioning of the securing clasp 50. If the securing clasp 50 springs into position outside of the tracks 26a, 26b, the clasp 50 will rest upon the longitudinal ribs 24 instead of against the outside surface 22 of body section 20. This makes it easier to reposition the securing clasp 50 within the proper track 26. The spring forces within the securing clasp 50 retain the coupling halves 10 about the adapter 110. The clasp 50 applies a force at a distance above the pivot point of the coupling halves 10. This prevents the securing clasp 50 from articulating in a radial direction and allows it to act as a cantilever spring. The forces within clasp 50 induce the coupling halves 10 to pivot about the inner ledge 32. This is facilitated by the angled bottom section 34 of the inner ledge 32. Thus, when an operator pushes inwards on the grip sections 12 of both coupling halves 10a and 10b, the coupling halves 10a, 10b pivot outwards, dislodging the locking tabs 40 from the slots 118.

Figures 5A, 5B:
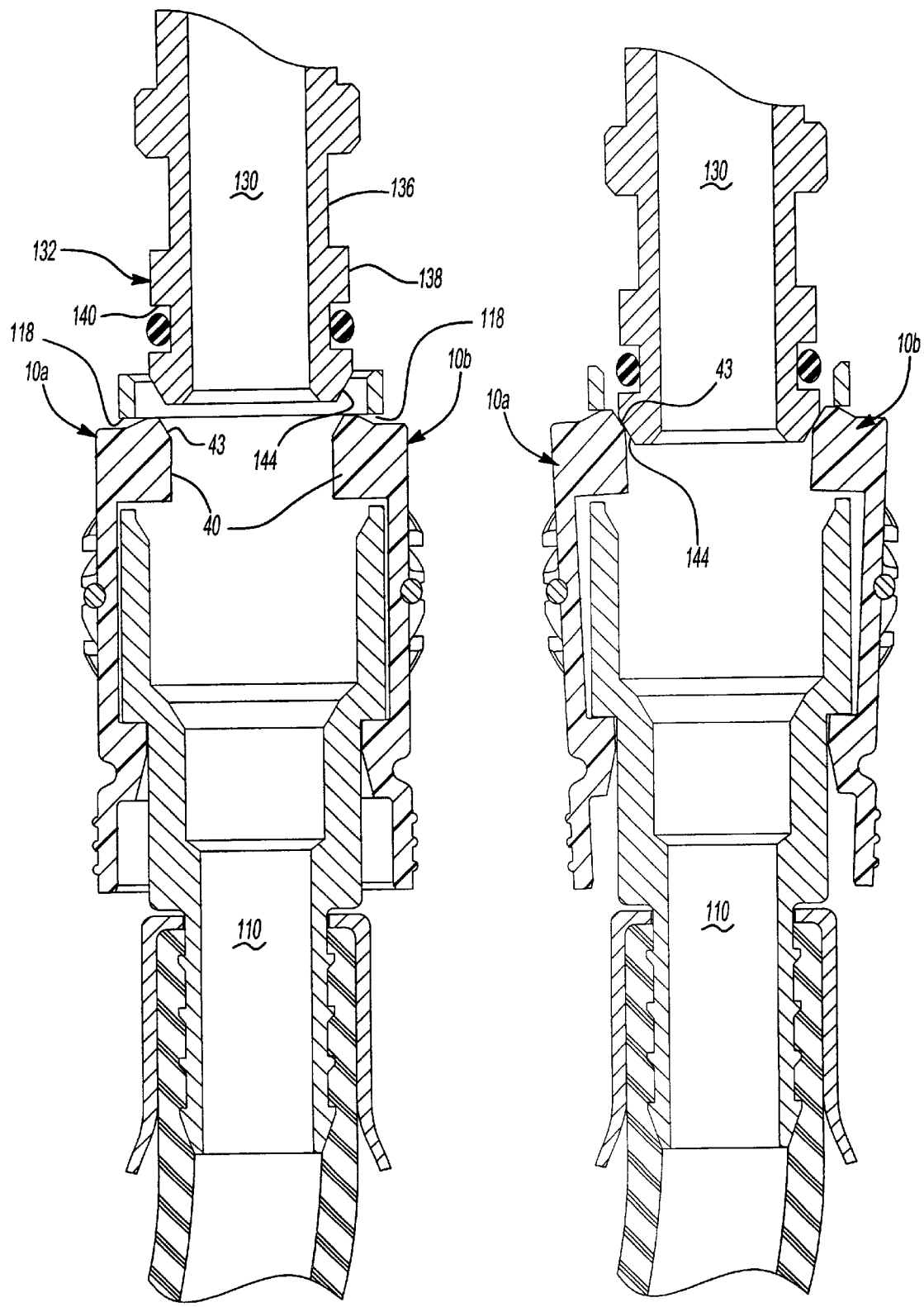
FIGS. 5a–5e illustrate in cross-sectional view how the quick connect coupling operates to connect the insertion conduit to the receiving conduit.
Figures 5C, 5D:
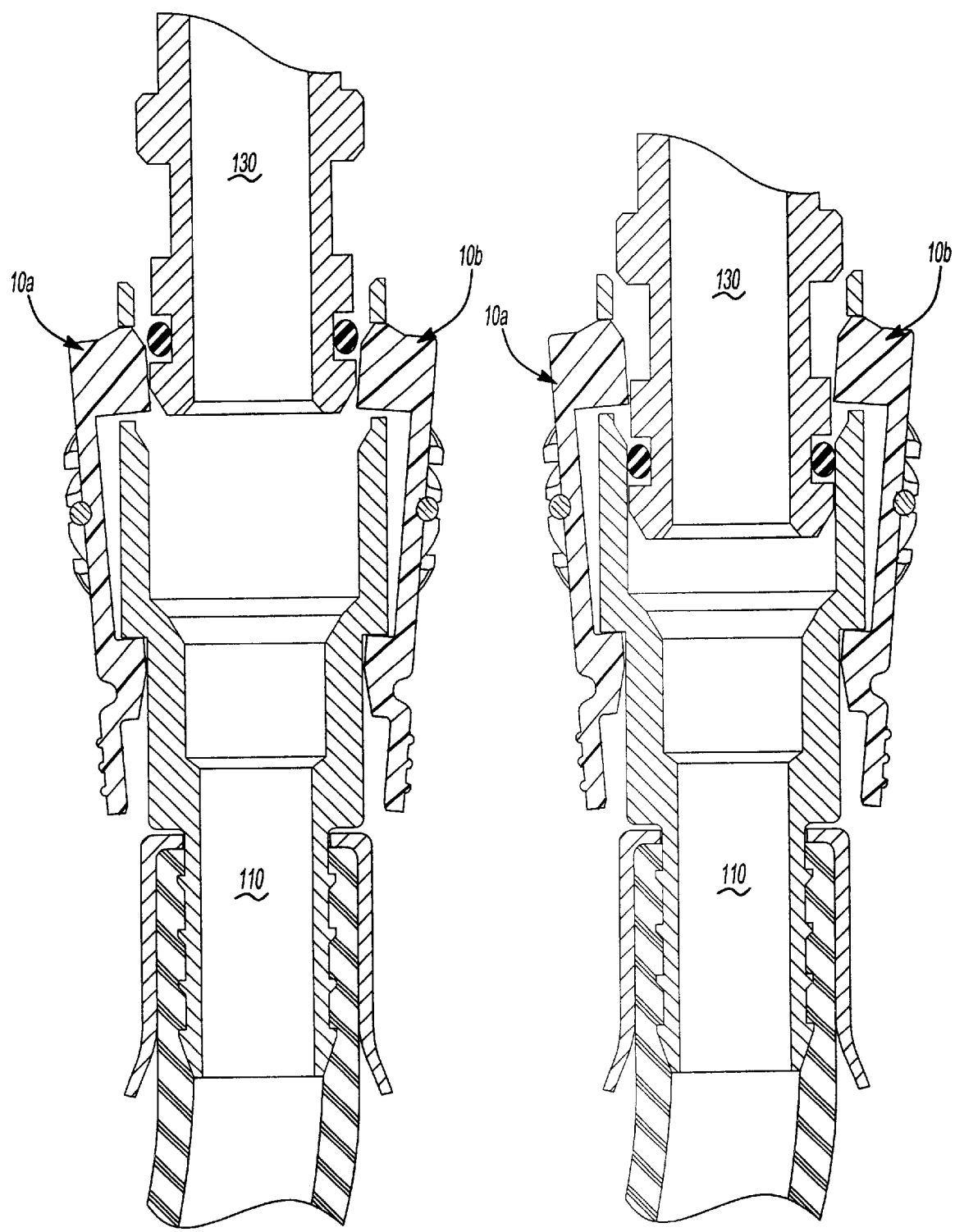
Figure 5E:
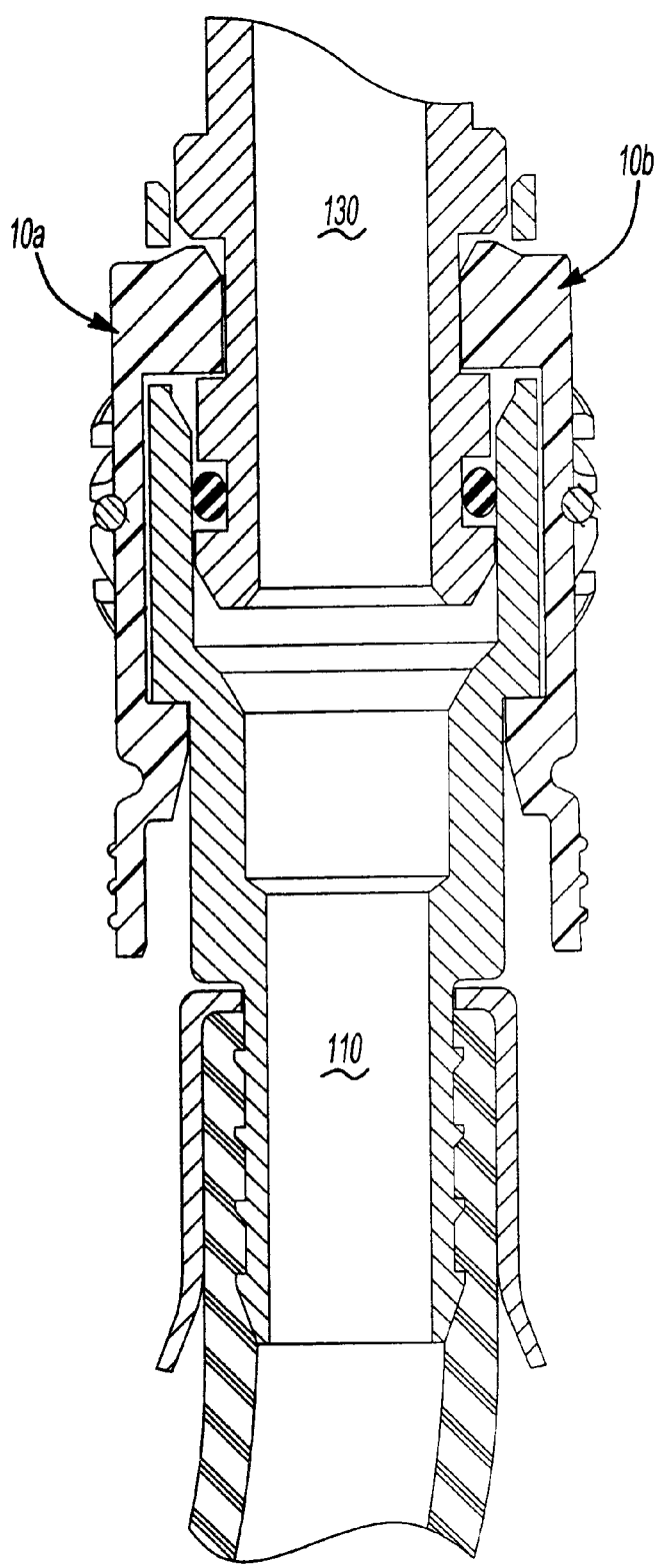

Once the quick connect coupling halves 10a, 10b and the clasp 50 are secured to the receiving conduit 100, the insertion conduit 130 may now be connected to the receiving conduit 100. As illustrated by FIGS. 5a through 5e, the insertion nipple 132 of the insertion conduit 130 is inserted into the adapter 110. As the insertion nipple 132 is inserted, the tapered tip section 144 impinges upon the inside slope 43 of the locking tab 40. As shown in FIG. 5b, this action spreads apart the locking tabs 40 of the coupling halves 10a, 10b, as the coupling halves 10a, 10b pivot about the inner ledge 32. As the insertion nipple 132 is inserted further, locking tabs 40 pass over the o-ring groove 140 and the step 138, and snap into the locking groove 136. The spring forces of the clasp 50 are sufficient to hold the locking tabs within the locking groove 136, thereby securely attaching receiving conduit 100 to the insertion conduit 130. In operation, the fluid pressure within the joined conduits 100, 130 tends to place an axial force along the conduits, attempting to pull the conduits 100, 130 apart. As the insertion conduit 130 is pulled upwards away from the receiving conduit 100, this pulling action draws the coupling halves 10a, 10b with the insertion conduit 130, until the locking tabs 40 is lodged against the annular rim 120. More precisely, the outside slope 44 of the angled roof section 42 of the locking tab 40 is pulled against the annular rim 120, forcing the angled roof section 42 under the annular rim 120. This action serves to further secure the coupling halves 10a, 10b to the receiving conduit 100 and to the insertion conduit 130. The limiting factor remains the structural integrity of the locking tab 40 itself. An axial force sufficient to separate the locking tab 40 from the coupling halves 10, will be sufficient to separate the insertion conduit 130 from the receiving conduit 100. However, in practice, such a force would be out of the ordinary.

To remove insertion conduit 130 from the receiving conduit 100, an operator simply squeezes together the grip section 12 of both coupling halves 10a, 10b. This action causes the coupling halves 10 to pivot outwards about the inner ledge 32, dislodging the locking tabs 40 from the locking groove 136. Once so dislodged, the insertion conduit 130 may readily be removed.

While the invention has been described in what is considered to be a preferred embodiment, other variations and modifications will become apparent to those skilled in the art. It is intended, therefore, that the invention not be limited to the illustrative embodiment but be interpreted within the full spirit and scope of the appended claims.

We claim:

1. A quick connect hose coupling for attaching an insertion hose to a receiving hose, the hose coupling comprising:
    first and second coupling halves, each half having an attachment end, a receiving end, an inner surface and an outer surface, the first and second coupling halves are identical to each other, and where the coupling halves are molded from a resilient plastic material; a pair of opposing, diagonally aligned tracks on the outer surface of each coupling half; and
    at least one securing clasp received within a diagonally aligned track, for releasably securing the first and second coupling halves about the receiving hose, the securing clasp being an elliptical metal band having resilient spring-metal qualities, such that when the insertion hose is inserted into the receiving hose, the hose coupling releasably secures the insertion and receiving hoses together.

2. The quick connect hose coupling according to claim 1, further comprising:
    circumferential ridges around the outer surface of the attachment end of the first and second coupling halves, the ridges extending upwards to a point below the diagonally aligned tracks, and
    axial ribs positioned at intervals around the outer surface of the coupling halves, so as to assist an operator to reposition the securing clasp within the track were the securing clasp to lodge outside the track against the outer surface of the coupling.

3. The quick connect hose coupling according to claim 2, further comprising:
    a circumferential ledge protruding from the inner surface of each coupling half, the ledge being adapted to securely engage a hose adapter attached to the receiving hose, the ledge comprising a top surface and a body portion, the body portion of the ledge being tapered towards the inner surface, the ledge being situated towards the lower portion of the diagonally aligned tracks, thereby providing a pivot area about the ledge as the coupling halves are pressed together.

4. The quick connect hose coupling according to claim 3, further comprising:

a locking tab protruding outwards from the inner surface of each coupling half and situated towards the attachment end thereof, the locking tab having an angled roof portion with an inside slope and an outside slope, and further, the locking tab being sized so as to be received within a slot within the hose adapter attached to the receiving hose.

5. A hose and quick connect coupling assembly comprising a first receiving hose having a receiving end, an insertion hose having an inserting end, a pair of quick connect coupling halves each coupling half being identical to the other and having an attachment end, a receiving end, an inner surface, and an outer surface, an adapter attached to the receiving end of the receiving hose, the adapter having a hose attachment section, a top section having a distal end, and a waist section, the waist section being of smaller diameter than both the hose attachment section and the top section, and the top section containing opposing slots cut into the top section towards the distal end thereof, creating an annular rim between the slots and the distal end of the top section, and a securing clasp, such that the securing clasp releasably secures the first and second coupling halves about the receiving hose, thereby releasably securing the receiving hose to the insertion hose as the insertion hose in inserted into to the receiving hose, wherein the securing clasp is an elliptical metal band having resilient spring-metal qualities, the securing clasp having an opening at one end to facilitate securing the clasp around the coupling halves.

6. The quick connect hose coupling assembly according to claim 5, wherein the inserting end of the insertion hose is adapted to have an annular locking groove bordered on the side closer to the inserting end by an annular step, and on the other side by an annular stop, both the annular step and the annular stop being of a larger diameter than the annular locking groove.

7. The quick connect hose coupling assembly according to claim 6, further comprising a pair of opposing, diagonally aligned tracks along the outer surface of each coupling half, for receiving the securing clasp.

8. The quick connect hose coupling assembly according to claim 7, further comprising:

a circumferential ledge protruding from the inner surface of the coupling halves towards the attachment end of each coupling half, the ledge comprising a top surface and a body portion, the body portion of the ledge being tapered towards the inner surface, this taper allowing the coupling halves to pivot about the ledge, thus allowing the receiving end of each coupling half to pivot outwards when the attachment ends of the coupling halves are depressed inwards, and a locking tab protruding outwards from the inner surface of each coupling half and situated towards the attachment end thereof, the locking tab having an angled roof portion with an inside slope and an outside slope, and further, the locking tab being sized so as to be received within the slot cut into the top section of the adapter attached to the receiving hose, such that, as each coupling is secured over the receiving hose by the securing clasp, the ledge rests within the waist section of the adapter, the locking tab rests within the slot in the adapter.

9. The quick connect hose coupling assembly according to claim 8, wherein as the insertion hose is inserted into the adapter of the receiving hose, the locking tabs of the coupling halves engage the annular locking groove of the insertion hose, thereby securing the insertion hose to the receiving hose.

10. The quick connect hose coupling assembly according to claim 9, further comprising:

circumferential ridges around the outer surface of the attachment end of the first and second coupling halves, the ridges extending upwards to a point below the diagonally aligned tracks, and axial ribs positioned at intervals around the outer surface of the coupling halves, so as to assist an operator in repositioning the securing clasp within the track were the clasp to lodge outside the track against the outer surface of the coupling.

* * * * *